Aug. 30, 1966  P. D. MAYO  3,269,414
MULTI-PORT FLOW-CONTROL VALVE
Filed Dec. 9, 1963
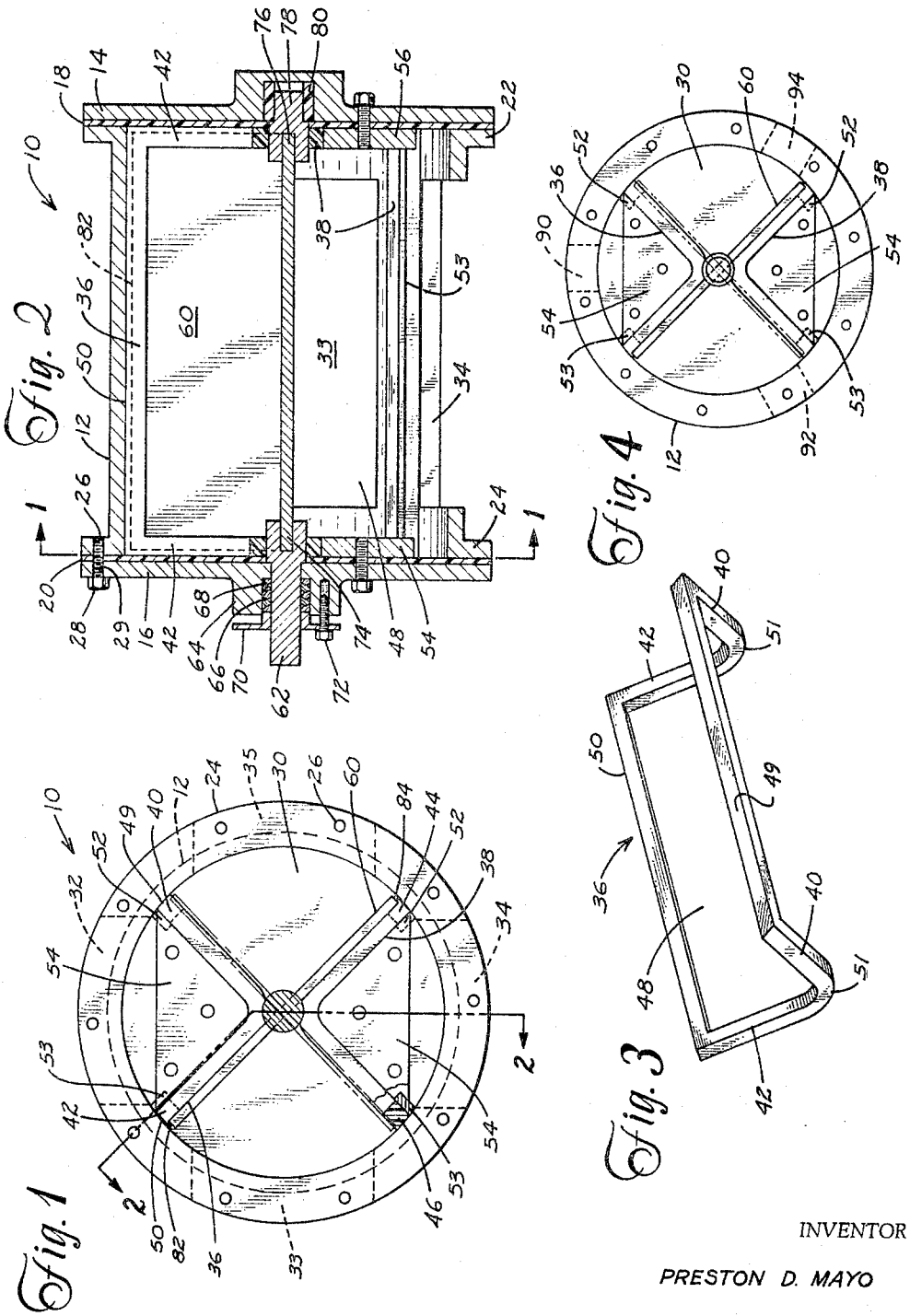
INVENTOR
PRESTON D. MAYO
BY  *Lawrence R. Hepner*
AGENT

United States Patent Office 3,269,414
Patented August 30, 1966

3,269,414
MULTI-PORT FLOW-CONTROL VALVE
Preston D. Mayo, Fairfax County, Va., assignor to Atlantic Research Corporation, Fairfax County, Va., a corporation of Virginia
Filed Dec. 9, 1963, Ser. No. 329,094
7 Claims. (Cl. 137—625.21)

This invention relates to a flow-control valve and, more patricularly, to a positive sealing, multi-port flow-control valve.

In many systems involving fluid flow it is necessary to alternate the flow of fluid through various conduits. Multi-port valves have been employed for this purpose but in many applications presently available valve have proved unsatisfactory. It is quite common for there to exist a pressure differential across the active valve member or rotor and prior art valves have been relatively unsuccessful in preventing leakage across the active valve member when such a pressure differential is present. For example, a common multi-port valve of the rotary four-way valve type employs a rotor which wipes against the inner surface of the valve casing in order to provide the desired sealing. It has been found that while such an arrangement might be effective for preventing leakage past the tips of the rotor, considerable leakage occurs across the edges as well as across the rotor axis. Furthermore, such wiping of the rotor against the inner surface of the casing results in wear of the sealing portion of the rotor which eventually leads to ineffective sealing. An additional disadvantage to such an arrangement is the undesirable additional torque required to operate this valve in order to overcome the friction occurring between the sealing portion of the rotor and the casing.

This invention provides a multi-port valve which eliminates the need for rubbing contact between the rotor and the casing and which effectively seals around the entire periphery of the rotor and along the rotor axis. In other words, the valve of the present invention overcomes the above disadvantages of the prior art.

Accordingly, it is one object of the present invention to provide an improved multi-port, flow-control valve which achieves effective, positive sealing.

It is another object of the present invention to provide an improved multi-port, flow-control valve which is relatively simple to operate and requires a minimum of power input.

Further objects and attendant advantages of this invention will become apparent and better understood from the following description.

Briefly stated, this invention in one form provides a multi-port flow-control valve comprising a housing including an annular cylindrical casing which cooperates with a pair of end plates sealingly mounted at each end thereof to form a fluid-receiving chamber. Four ports, equally circumferentially spaced, extend through the casing and communicate with the fluid-receiving chamber. The active valve means for directly controlling the fluid-flow includes a vane drivingly attached to a shaft which is rotatably mounted concentrically within the casing. The vane extends diametrically across the casing with the tips of the vane being minimally spaced from the casing to permit free rotation thereof.

A pair of sealing members is mounted within the casing which, in combination with the vane, provides effective positive sealing. Each sealing member comprises a V-shaped member having an aperture extending therethrough to form a sealing frame. The sealing members are located within the casing such that one leg of one of the V-shaped members extends from the casing between a first and a second port inwardly toward the shaft and sealingly engages the shaft. The second leg of the V-shaped member extends inwardly from a point on the casing between the first and a third port and also sealingly engages the shaft. The other V-shaped member is similarly mounted within the casing with one leg mounted between a fourth port and the second port and the other leg mounted between the fourth port and the third port. The aperture extending through each leg permits flow between adjacent ports.

Actuation of the shaft causes the vane to rotate until it sealingly abuts one leg of each sealing member to obturate the aperture of each respective leg. Such obturation permits flow between adjacent ports on one side of the vane and interrupts communication between ports located on opposite sides of the vane. Counterrotation of the vane through 90° causes the vane to sealingly abut the other leg of each sealing member, thus reversing the flow pattern.

While the specification concludes with claims particularly pointing out and distinctly claiming the subject matter which is regarded as the invention, it is believed that the invention will become better understood from the following description taken in combination with the accompanying drawing in which:

FIGURE 1 is a sectional end view of a four-way flow-control valve formed in accordance with a first embodiment of this invention.

FIGURE 2 is a sectional view taken along line 2—2 of FIGURE 1.

FIGURE 3 is a perspective view of a sealing member employed in the valve illustrated in FIGURE 1.

FIGURE 4 is a sectional end view of a three-way flow-control valve formed in accordance with a second embodiment of this invention.

With reference to the drawing, and in particular FIGURES 1 and 2, there is shown a four-way flow-control valve 10. The valve 10 includes a housing formed of a cylindrical annular casing 12 and a pair of closure members or end plates 14, 16 mounted at each end of the casing 12. A pair of gaskets 18, 20 is provided, one gasket being placed between each end plate 14, 16 and its respective end of the casing 12. Each end of the casing 12 is provided with a flange 22, 24 having a plurality of internally threaded bolt holes 26 extending therethrough. The end plates 14, 16 are thus fixedly mounted to the casing 12 by means of a plurality of bolts 28 extending through bolt holes 29 in the end plates, through the gaskets 18, 20 and into the casing flanges 22, 24 respectively. The bolts draw the end plates 14, 16 sufficiently tight against the gaskets 18, 20 and the casing flanges 22, 24 respectively to form a fluid-tight valve housing having a fluid-receiving chamber 30 therein.

Four fluid-flow ports 32, 33, 34, 35 extend through the casing 12 and communicate with the chamber 30. The ports 32–35 are evenly circumferentially spaced about the casing; i.e., at 90° intervals, the axis of these ports being coplanar within a plane perpendicular to the axis of the casing 12.

In order to provide effective, positive sealing, a pair of identical sealing members 36, 38 are mounted within the casing 12. Each sealing member comprises a V-shaped resilient member, the legs of which are angularly disposed, preferably orthogonally disposed, with respect to one another, the legs of the sealing member 36 being designated as 40 and 42 and the legs of the sealing member 38 being designated as 44 and 46. For clarification of explanation, one of the sealing members 36 is illustrated in FIGURE 3. An aperture 48 is provided through the legs of each sealing member effecting the formation of a sealing frame. The first sealing member 36 is mounted within the casing 12 such that the edge 49 of one leg 40 is in sealing relationship with the inner surface of the casing 12 midway between two adjacent ports 32, 35 while the edge 50 of the other leg 42 is mounted in sealing relationship with the inner surface of the casing 12 at a point midway between the first mentioned port 32 and a third port 33. Both legs 40, 42 extend inwardly towards the center of the casing 12 but are of such a length that the apex 51 of the V-shaped sealing member 36 is displaced slightly from the axis of the casing 12 to permit the mounting of a shaft as described below.

The sealing members are made from a material sufficiently resilient (elastic) to permit temporary deformation thereof by the active valve means, which is described below to effect complete sealing. Choice of the particular material employed is dictated by the environmental factors accompanying the use of the valve, these factors being temperature, pressure, chemical properties of the fluid, etc. Some examples of materials which can be used are resilient synthetic elastomers such as silicone rubbers, rubbery hydrocarbon polymers and polychloroprene (neoprene).

A pair of elongated rectangular support members 52, 53 are mounted longitudinally along the inner surface of the casing contiguous to the edges 49, 50 of legs 40, 42, respectively, of the sealing member 36. The length of each support member 52, 53 is less than the length of the casing 12 thus forming a hiatus between each end of the support members and the ends of the casing. The support members 52, 53 are attached to the inner surface of the sealing member 36, that is, within the included angle formed by the legs 40, 42 of the sealing member 36 as may be clearly seen in FIGURE 1.

In order to sufficiently support the legs 40, 42 and preserve the V-shape of the sealing member 36, there is provided a pair of triangular support members 54, 56, one of which is mounted at each end of the sealing member 36. The triangular support members 54, 56 are fixed to the ends of the rectangular support members 52, 53 by any appropriate means, such as by welding, and are of such a thickness as to fill the hiatus occurring between the ends of the rectangular support members 52, 53 and the ends of the casing 12.

An identical mounting arrangement is provided for the sealing member 38 whereby one leg 44 is mounted between the fourth port 34 and the second port 35 while the other leg 46 is mounted between the fourth port 34 and the third port 33. Because of the identicality of mounting means the same numbers are used to indicate corresponding parts. The sealing member 38 is mounted directly opposite the sealing member 36 such that the outer surface of the opposed legs, for example, legs 40 and 46, are aligned.

The active valve means is mounted within the casing 12 in order to control and direct the flow of fluid through the particular ports as desired. The active valve means comprises a vane 60 which is drivingly connected to a shaft 62 rotatably mounted concentrically within the casing 12. To facilitate mounting of the shaft 62, one end plate 16 is provided with an annular flanged portion 64 on the outer surface thereof, the flanged portion being concentric with the casing axis. A chevron type gasket bearing 66 is placed within the pocket 68 formed by the flanged portion 64 and is held in place by means of an annular plug 70 which is fastened to the end of the flanged portion 64 by means of a plurality of bolts 72. The shaft 62 is rotatably supported within and by the bearing 66. The bearing material is chosen such that proper sealing can be attained without producing limiting torsional resistance on the shaft. An example of such a material is polytetrafluoroethylene (Teflon).

The shaft 62 extends inwardly through the end plate 16 and gasket 20 and sealingly engages the outer surface of both sealing members 36, 38. The sealing engagement takes place at the apex 51 of the sealing members and effectively eliminates leakage across the shaft. In the preferred embodiment of this invention the shaft does not extend completely across the length of the casing 12 but merely extends sufficiently past one end of the triangular support plates 54 to permit mounting of the vane thereon as may be seen in FIGURE 2.

The vane 60 comprises a rectangular plate which is mounted at one end 74 to the shaft 62 by any suitable means, such as by keying it thereto through a slot provided in the end of the shaft 62. The other end 76 of the vane 60 is supported by a trunnion 78 mounted for rotation within a bearing 80, which, in turn, is received within a pocket formed in the end plate 14. The trunnion 78 sealingly engages the sealing members 36, 38 at the end thereof adjacent the end plate 14 in a manner similar to the engagement of the shaft 62 with the sealing members 36, 38. By this arrangement there is a continuous wiping action between the rotatable vane supports, i.e., the shaft 62 and the trunnion 78, and the sealing members 36, 38 thus eliminating leakage along the axis of the vane.

The vane 60 extends diametrically across the fluid-receiving chamber 30 and has a diametrical length slightly less than the internal diameter of the casing 12. By concentrically mounting the vane 60 within the casing 12 minimal clearance is provided between the vane tips 82, 84 and the inner surface of the casing 12 in order to permit free rotation of the vane within the casing 12. This clearance minimizes the required power input as only enough is needed to overcome bearing friction and to seat the vane 60.

The vane is rotated by coupling the shaft 62 to any suitable power device such as a geared down electric motor or mechanical crank (not shown). Clockwise rotation of the vane 60 causes the vane to sealingly abut one leg of each sealing member 36, 38. As may be seen in FIGURE 1, one half of the vane 60 abuts the leg 42 of the sealing member 36 while the other half of the vane 60 abuts the leg 44 of the sealing member 38. The vane is of sufficient length and width to insure complete obturation of the portion of the aperture 48 extending through these respective legs of the sealing members and, because the sealing members are frame-shaped, the vane 60 is sealed around its entire periphery. By applying sufficient force or torque to the vane 60 through the shaft 62 the vane is caused to become partially embedded within the resilient sealing members 36, 38 and cause the sealing members to deform sufficiently over the tips 82, 84 of the vane to provide effective sealing. When the vane is in the above-described position illustrated by the solid lines in FIGURE 1, flow communication between ports 32 and 33 and between ports 34 and 35 is interrupted while flow communication between ports 32 and 35 and between ports 34 and 33 is preserved. Counter rotation of the vane 60 through an arcuate length of 90° causes the vane to sealingly abut the other legs 40, 46 of the sealing members 36, 38 respectively. When the vane is in the latter position, illustrated by the dotted lines in FIGURE 1, flow communication between ports 32 and 35 and between ports 34, 33 is interrupted while flow communication between ports 32 and 33 and between ports 34 and 35 is continued.

Therefore, it may be easily seen that when it is desired to direct fluid flow between ports 32 and 35 and between ports 34 and 33 the shaft 62 is rotated in a clockwise direction thus effecting the desired sealing through means of legs 42, 44 of sealing members 36, 38 respectively. Conversely, when it is desired to direct fluid flow between ports 32, 33, and between ports 34, 35, the actuating means rotates the shaft 62 counterclockwise causing the vane 60 to sealingly engage the legs 40, 46 of the sealing members 36, 38 respectively.

While the valve has thus far been described in terms of a four-way flow control valve, it is similarly applicable to three-way valves as may be seen in FIGURE 4, where corresponding parts are designated by the same numerals employed in FIGURE 1 and the ports are designated as 90, 92, 94. While it is not necessary to provide an aperture through one of the sealing members, namely, member 38, in the three-way valve, for simplicity in manufacturing and storage it might be easier and less expensive to use only one type of sealing member in both locations within the valve.

It can be seen that flow-control valves formed in accordance with the afore-discussed embodiments effectively direct flow through the valve in the desired directions while eliminating internal leakage. Furthermore, effective sealing is achieved in a manner requiring a minimum of power input to operate the active members of the valve by eliminating any sliding friction between the rotor member or vane and the valve casing. Additionally, the valve is formed of components which are easily manufactured and assembled and the number of moving parts is minimized thus resulting in an inexpensive, easily produced, and highly effective flow-control valve.

While two specific embodiments have been shown and described above, it will be obvious to those skilled in the art that various changes and modifications may be made without departing from the invention in its broader aspects. For example, while the sealing members have been described as having a single aperture extending through both legs, it is clear that providing an aperture through each leg would produce the same results. Therefore, it is intended in the appended claims to cover all such changes and modifications as fall within the true spirit and scope of this invention.

What is claimed as new and desired to be secured by Letters Patent of the United States is:

1. A flow-control valve comprising:
   (a) a housing including an annular casing and a closure member sealingly mounted on each end of said casing to form a fluid-receiving chamber therein, said casing including a plurality of circumferentially spaced ports extending therethrough, each of said ports communicating with said chamber,
   (b) a sealing member mounted within said casing, said sealing member having two angularly disposed legs, one of said legs being mounted in sealing relationship with said casing between a first one of said ports and a second one of said ports, the other of said legs being mounted in sealing relationship with said casing between said first one of said ports and a third one of said ports, each of said legs having an aperture therethrough to provide a sealing frame and to provide fluid-flow communication between said first one of said ports and said second and third ones of said ports, respectively, and
   (c) a valve member including
       (i) a rotatable shaft concentrically mounted within said casing and sealingly engaging each of said legs, and
       (ii) a vane drivingly attached to said shaft and extending diametrically across said chamber, the tips of said vane being adjacent said casing, said valve member being pivotable between
           (aa) a first position wherein said vane sealingly abuts said one of said legs to interrupt said communication between said first and said second ones of said ports, and
           (bb) a second position wherein said vane sealingly abuts said other of said legs to interrupt said communication between said first and said third ones of said ports.

2. A flow-control valve as defined in claim 1 wherein:
   (a) said plurality of ports comprises three ports,
   (b) the axes of said ports are coplanar, and
   (c) said legs are substantially orthogonally disposed relative to each other.

3. A flow-control valve comprising:
   (a) a housing including an annular casing and a closure member sealingly mounted on each end of said casing to form a fluid-receiving chamber therein, said casing having four circumferentially spaced ports extending therethrough, each of said ports communicating with said chamber,
   (b) sealing means mounted within said casing, said sealing means comprising
       (i) a first sealing member having first and second angularly disposed legs, said first leg being mounted in sealing relationship with said casing between a first one of said ports and a second one of said ports, said second leg being mounted in sealing relationship with said casing between said first one of said ports and a third one of said ports, said first and said second legs each having an aperture therethrough to provide a sealing frame and to provide fluid flow communication between said first one of said ports and said second and third ones of said ports, respectively, and
       (ii) a second sealing member having third and fourth angularly disposed legs, said third leg being mounted in sealing relationship with said casing between a fourth one of said ports and said second one of said ports, said fourth leg being mounted in sealing relationship with said casing between said fourth one of said ports and said third one of said ports, said third and said fourth legs each having an aperture therethrough to provide a sealing frame and to provide fluid-flow communication between said fourth one of said ports and said second and third ones of said ports, respectively, and
   (c) a valve member including
       (i) a rotatable shaft concentrically mounted within said casing and sealingly engaging each of said sealing members, and
       (ii) a vane drivingly attached to said shaft and extending diametrically across said chamber, the tips of said vane being adjacent said casing, said valve member being pivotable between,
           (aa) a first position wherein said vane sealingly abuts said first and said fourth ones of said legs to interrupt said communication between said first and said second ones of said ports and between said fourth and said third ones of said ports respectively, and
           (bb) a second position wherein said vane sealingly abuts said second and said third ones of said legs to interrupt said communication between said first and said third ones of said ports and between said fourth and said second one of said ports, respectively.

4. A flow-control valve as defined in claim 3 wherein:
   (a) said ports are circumferentially spaced at 90° intervals,
   (b) the axes of said ports are coplanar,
   (c) said first and said second legs are substantially orthogonally disposed relative to each other, and
   (d) said third and said fourth legs are substantially orthogonally disposed relative to each other.

5. A flow-control valve as defined in claim 3 wherein said sealing members are made of resilient synthetic polymer.

6. A flow-control valve comprising
   (a) a housing including an annular casing and a closure member sealingly mounted on each end of said casing to form a fluid-receiving chamber therein, said casing having four ports extending therethrough, said ports being spaced circumferentially at 90° intervals, each of said ports communicating with said chamber,
   (b) sealing means mounted within said casing, said sealing means comprising
       (i) four elongated support members fixedly attached to and extending longitudinally of said casing, one of said support members being mounted between each pair of adjacent ports, (ii) a first sealing member having first and second orthogonally disposed legs, said first leg being mounted at one end thereof to a first one of said support members and in sealing relationship with said casing between a first one of said ports and a second one of said ports, said second leg being mounted at one end thereof to a second one of said support members and in sealing relationship with said casing between said first one of said ports and a third one of said ports, said first and said second legs being joined at their respective other ends and each having an aperture therethrough to provide a sealing frame and to provide fluid flow communication between said first one of said ports and said second and third ones of said ports, respectively, and (iii) a second sealing member having third and fourth orthogonally disposed legs, said third leg being mounted at one end thereof to a third one of said support members and in sealing relationship with said casing between a fourth one of said ports and said second one of said ports, said fourth leg being mounted at one end thereof to a fourth one of said support members and in sealing relationship with said casing between said fourth one of said ports and said third one of said ports, said third and said fourth legs being joined at their respective other ends and each having an aperture therethrough to provide a sealing frame and to provide fluid-flow communication between said fourth one of said ports and said second and third ones of said ports, respectively, and (c) a valve member including,
 (i) a rotatable shaft concentrically mounted within said casing and sealingly engaging each of said legs at their said joined ends, and
 (ii) a vane drivingly attached to said shaft and extending diametrically across said chamber, the tips of said vane being adjacent said casing, said valve member being pivotable between,
  (aa) a first position wherein said vane sealingly abuts said first and said fourth ones of said legs to interrupt said communication between said first and said second ones of said ports and between said fourth and said third ones of said ports, respectively, and
  (bb) a second position wherein said vane sealingly abuts said second and said third ones of said legs to interrupt said communication between said first and said third ones of said ports and between said fourth and said second ones of said ports, respectively.

7. A flow-control valve as defined in claim 6 including four triangular support members, one of said triangular members being mounted at and in supporting contact with each end of said first and second legs and each end of said third and fourth legs.

References Cited by the Examiner

UNITED STATES PATENTS

| | | | |
|---|---|---|---|
| 544,799 | 8/1895 | Swindell | 137—625.43 X |
| 813,771 | 2/1906 | Bush | 251—306 X |
| 2,703,586 | 3/1955 | Asker | 137—625.43 |
| 2,817,360 | 12/1957 | Asker | 137—625.43 |
| 2,946,554 | 7/1960 | Asker et al. | 251—368 X |

FOREIGN PATENTS 631,957  11/1949  Great Britain.

M. CARY NELSON, *Primary Examiner.*

A. ROSENTHAL, *Examiner.*